United States Patent
Ogale

(10) Patent No.: US 11,572,644 B2
(45) Date of Patent: Feb. 7, 2023

(54) PULSED-PRESSURE CONSOLIDATION OF BRAIDED PREFORMS FOR COMPOSITE PARTS

(71) Applicant: The Boeing Company, Chicago, IL (US)

(72) Inventor: Amol Ogale, Munich (DE)

(73) Assignee: The Boeing Company, Chicago, IL (US)

( * ) Notice: Subject to any disclaimer, the term of this patent is extended or adjusted under 35 U.S.C. 154(b) by 818 days.

(21) Appl. No.: 16/457,202

(22) Filed: Jun. 28, 2019

(65) Prior Publication Data

US 2020/0407894 A1    Dec. 31, 2020

(51) Int. Cl.
| | | |
|---|---|---|
| *D04C 3/40* | (2006.01) | |
| *B29B 11/16* | (2006.01) | |
| *D04C 3/48* | (2006.01) | |
| *F16L 11/02* | (2006.01) | |
| *F16L 11/08* | (2006.01) | |

(52) U.S. Cl.
CPC ............... *D04C 3/40* (2013.01); *B29B 11/16* (2013.01); *D04C 3/48* (2013.01); *F16L 11/02* (2013.01); *F16L 11/085* (2013.01)

(58) Field of Classification Search
CPC ... D04C 3/40; D04C 3/48; B29B 11/16; F16L 11/02; F16L 11/085
See application file for complete search history.

(56) References Cited

U.S. PATENT DOCUMENTS

| | | | |
|---|---|---|---|
| 6,231,796 B1 | 5/2001 | Allen | |
| 8,932,421 B2 * | 1/2015 | Inazawa | B29C 70/446 |
| | | | 156/287 |
| 9,044,657 B2 * | 6/2015 | Jeanneau | A63B 59/70 |
| 9,358,703 B2 * | 6/2016 | Matsen | B29C 70/446 |
| 9,662,742 B2 * | 5/2017 | Matsen | B23K 20/129 |
| 10,029,398 B2 * | 7/2018 | Matsen | B29C 70/345 |
| 10,309,537 B2 * | 6/2019 | Kang | F17D 3/16 |
| 2005/0035115 A1 * | 2/2005 | Anderson | B29C 33/04 |
| | | | 219/759 |
| 2005/0258575 A1 * | 11/2005 | Kruse | B29C 70/086 |
| | | | 264/573 |

(Continued)

FOREIGN PATENT DOCUMENTS

EP      3378634 A1    9/2018

OTHER PUBLICATIONS

European Search Report; Application EP20168832; dated Sep. 10, 2020.

(Continued)

*Primary Examiner* — Craig M Schneider
*Assistant Examiner* — David R Deal
(74) *Attorney, Agent, or Firm* — Duft & Bornsen, PC

(57) ABSTRACT

Systems and methods are provided for consolidating a preform of braided fiber. One embodiment is a method that includes acquiring a braided preform comprising fibers of unidirectional material that have been woven into a shape having a closed cross-section, disposing the braided preform within a mandrel, disposing an inflatable bladder within the closed cross-section of the braided preform, and iteratively applying pressure to the braided preform via the bladder to consolidate the braided preform against the mandrel.

25 Claims, 13 Drawing Sheets

(56) References Cited

U.S. PATENT DOCUMENTS

| | | | | |
|---|---|---|---|---|
| 2006/0112996 A1* | 6/2006 | Poole | ............... | F16L 55/1645 |
| | | | | 138/97 |
| 2011/0277918 A1* | 11/2011 | Lee | ................ | B32B 37/0046 |
| | | | | 156/580 |
| 2012/0114973 A1* | 5/2012 | Jacobsen | ............ | B32B 37/14 |
| | | | | 428/221 |
| 2018/0126598 A1* | 5/2018 | Hollander | ........... | B32B 5/245 |
| 2018/0257314 A1* | 9/2018 | Destories | .......... | B29C 33/505 |

OTHER PUBLICATIONS

Michaeli W et al; Combined Moulding Speeds Hollow Parts; Mar. 1, 1996.

European Office action; Application 20168832.2; dated Oct. 21, 2021.

Glossary of terms; In: "Composites", ASM International, USA, ISBN: 978-0-87-170703-1 pp. 1113-1136, Dec. 1, 2001.

Automated Fiber Placement; Wikipedia; Apr. 26, 2019.

Braided Composited; https://www.highlandcomposites.com/innovation/braided-composites; Apr. 26, 2019.

QISO Braided Triaxial Fabric; A & P Technology; www.braider.com/Products/QUISO-Braided-Triaxial-Fabric.aspx; Apr. 29, 2019.

\* cited by examiner

PULSED-PRESSURE CONSOLIDATION OF BRAIDED PREFORMS FOR COMPOSITE PARTS

FIELD

The disclosure relates to the field of fabrication, and in particular, to fabrication of composite materials.

BACKGROUND

Braided fiber-reinforced composite parts may be utilized for a variety of purposes. For example, a braided composite part may form a fuel-feed tube for transporting jet fuel between or within aircraft. While braided composite parts provide a substantial amount of strength, these composite parts may be difficult to fabricate. For example, during consolidation, preforms for braided composite parts may exhibit shear lock at intersections between fibers that cross each other in the weave, or may otherwise encounter friction locking issues. If such conditions are encountered, the braids of the resulting composite part may be uneven or out-of-tolerance, which necessitates reworking or discarding the composite part.

Therefore, it would be desirable to have a method and apparatus that take into account at least some of the issues discussed above, as well as other possible issues.

SUMMARY

Embodiments described herein provide for pulsed-pressure consolidation of braided preforms for composite parts. By iteratively increasing and decreasing applied consolidation pressure, areas within a weave that have encountered a friction lock or a shear lock relax, releasing the lock and enabling consolidation to continue during a next application of pressure.

One embodiment is a method for consolidating a preform of braided fiber. The method includes acquiring a braided preform comprising fibers of unidirectional material that have been woven into a shape having a closed cross-section, disposing the braided preform within a mandrel, disposing an inflatable bladder within the closed cross-section of the braided preform, and iteratively applying pressure to the braided preform via the bladder to consolidate the braided preform against the mandrel.

A further embodiment is a non-transitory computer readable medium embodying programmed instructions which, when executed by a processor, are operable for performing a method for consolidating a preform of braided fiber. The method includes acquiring a braided preform comprising fibers of unidirectional material that have been woven into a shape having a closed cross-section, disposing the braided preform within a mandrel, disposing an inflatable bladder within the closed cross-section of the braided preform, and iteratively applying pressure to the braided preform via the bladder to consolidate the braided preform against the mandrel.

A still-further embodiment is an apparatus for consolidating a preform of braided fiber. The apparatus includes a mandrel that is dimensioned to receive the braided preform, a bladder that is dimensioned to fit within a closed cross-section of the braided preform, and a controller that iteratively applies pressure to the bladder to consolidate the braided preform against the mandrel.

Yet another embodiment is a method for consolidating a braided preform. The method includes acquiring a braided preform comprising fibers of unidirectional material that have been woven into a shape having a closed cross-section, increasing a consolidation force applied to the braided preform, and determining whether fibers in the braided preform are shear locked. In response to determining that the fibers in the braided preform are not shear locked, the method includes further increasing the consolidation force. In response to determining that the fibers in the braided preform are shear locked, the method further includes decreasing the consolidation force.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
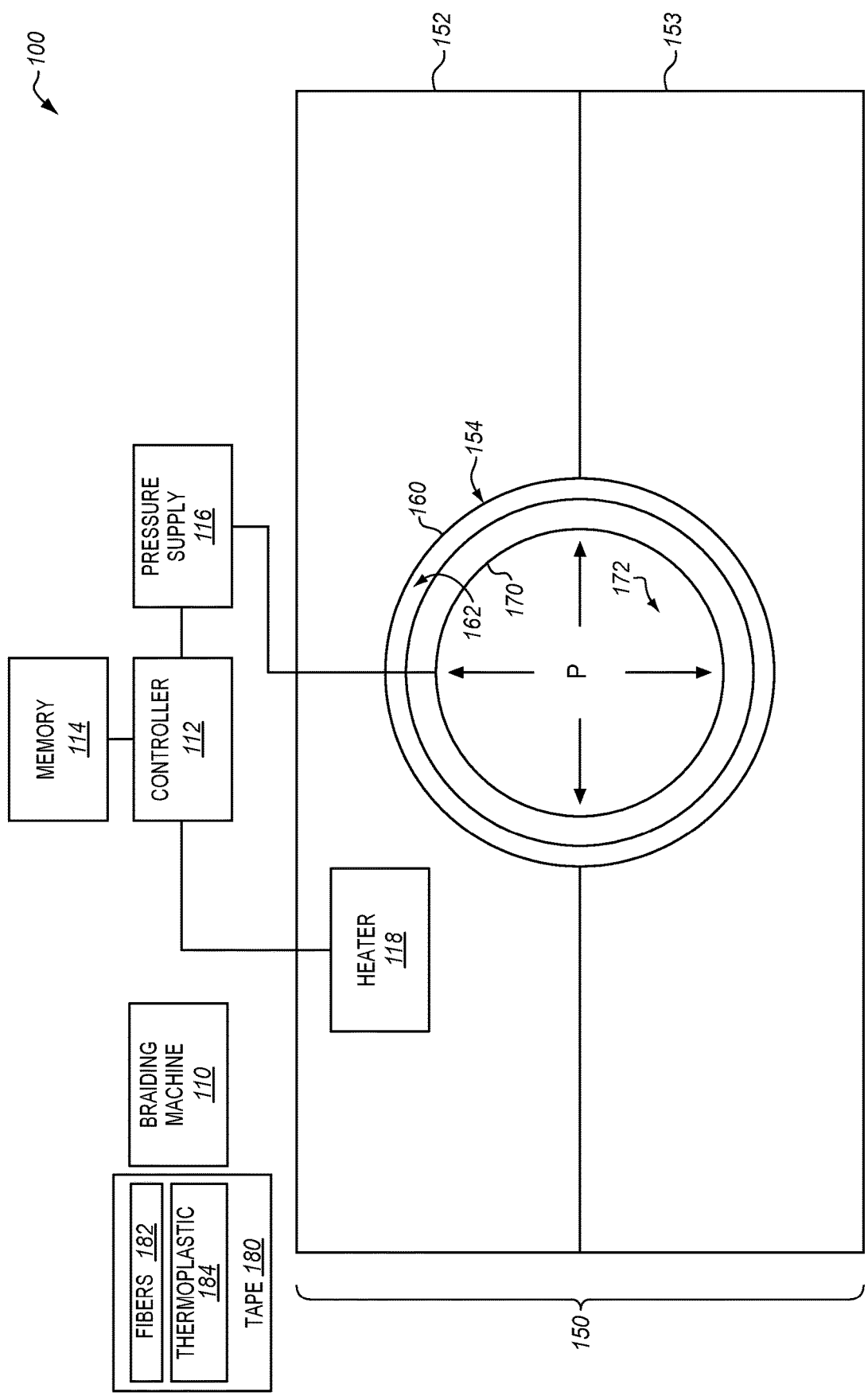
FIG. 1 is a block diagram of a consolidation system for braided preforms in an illustrative embodiment.

FIG. 1 is a block diagram of a consolidation system 100 for braided preforms in an illustrative embodiment. Consolidation system 100 comprises any suitable system for applying consolidation pressure to a braided preform comprising interwoven fibers of material that form a closed cross-sectional shape. Examples of such preforms include tubular braided preforms.

In this embodiment, consolidation system 100 includes a braiding machine 110, such as an industrial three dimensional (3D) braiding machine, which utilizes bobbins circumferentially arranged on a frame, and which travel in predetermined orbital paths with respect to each other in accordance with defined programs to form a braid.

In one embodiment, controller 112 operates the braiding machine 110 according to instructions stored in an NC program in memory 114 in order to fabricate a braided preform 160 having a closed cross-section 162. For example, the braiding machine 110 may utilize tape 180, comprising fibers 182 and thermoplastic 184, as inputs to the fabrication process which are interwoven. The thermoplastic 184 may comprise polyetheretherketone (PEEK) or polyetherketoneketone (PEKK). The braided preform 160 includes fibers 182 which are interwoven with each other (e.g., carbon fibers, glass fibers), and may be pre-impregnated with the thermoplastic 184. The braided preform 160 is placed within a void 154, which is defined by portion 152 and portion 153 of mandrel 150. A bladder 170 (e.g., a polyimide bladder) that is flexible, yet capable of retaining physical integrity at or near a melting point of the thermoplastic, is dimensioned to fit within the closed cross-section 162 of the braided preform 160.

During consolidation, controller 112 controls an amount of pressure (P) applied to inflate an interior 172 of the bladder 170 via a pressure supply 116 (e.g., a reservoir of compressed gas). The pressure forces the bladder 170 against the braided preform 160, compacting the braided preform 160 between the bladder 170 and the mandrel 150. When held together in contact, the portions of the mandrel 150 defines a boundary (e.g., an outer boundary) of the preform.

Heater 118 may apply heat during consolidation (i.e., during iterative application of pressure). In one embodiment, heater 118 increases a temperature of the braided preform 160 during consolidation to a processing temperature below (e.g., within thirty degrees Fahrenheit of) a melting temperature of thermoplastic within the braided preform 160. Heater 118 may comprise a susceptor, radiant heating element, resistive heater, or other component. The operations of heater 118 are managed by controller 112. Controller 112 may be implemented, for example, as custom circuitry, as a hardware processor executing programmed instructions, or some combination thereof operating an actuatable valve or other component.

Illustrative details of the operation of consolidation system 100 will be discussed with regard to FIG. 2. Assume, for this embodiment, that the braided preform 160 has been fabricated by the braiding machine 110, and that the braided preform 160 is ready for consolidation into a desired shape.

Figure 2:
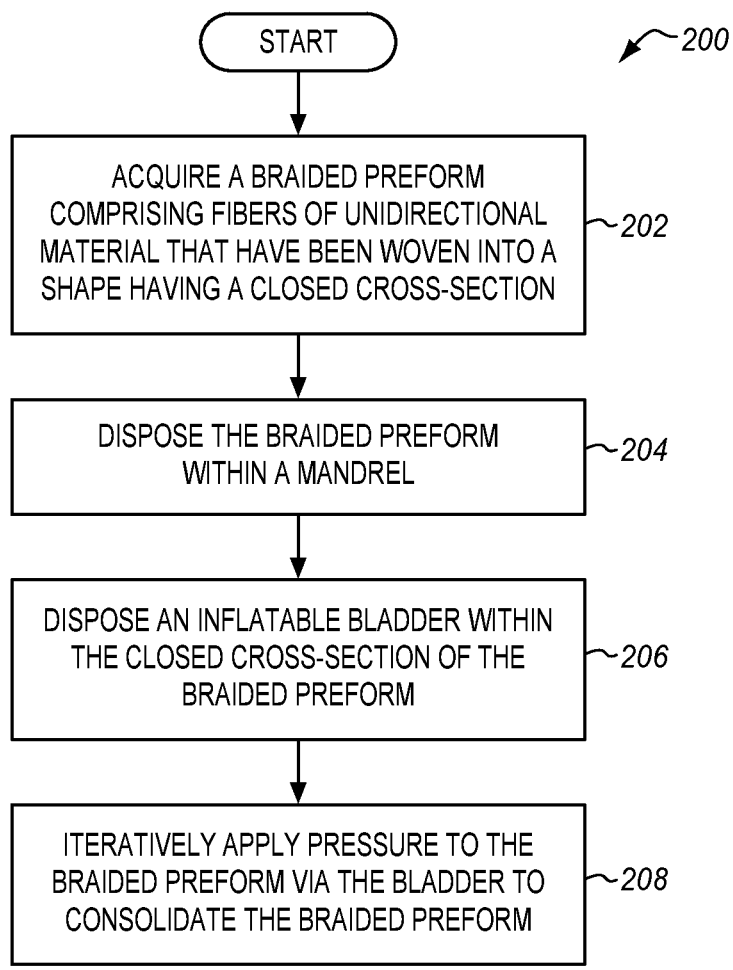
FIG. 2 is a flowchart illustrating a method for operating a consolidation system in an illustrative embodiment.

FIG. 2 is a flowchart illustrating a method for operating a consolidation system in an illustrative embodiment. The steps of method 200 are described with reference to consolidation system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, the braided preform 160 is acquired. The braided preform 160 is fully woven, and includes fibers of unidirectional material (e.g., carbon fiber) that have been woven into a shape having a closed cross-section 162. For example, the braided preform 160 may comprise a tube having a square cross-section, an elliptical cross-section, a circular cross-section, etc. Acquiring the braided preform 160 may comprise operating an end effector or pick and place machine to pick up or otherwise remove the braided preform 160 from the braiding machine.

In step 204, the braided preform 160 is disposed within the mandrel 150. In one embodiment, this operation comprises placing the braided preform 160 within a portion 153 of the mandrel 150, and then placing a portion 152 that is complementary to the portion 153 of the mandrel 150 atop the braided preform 160 in order to form the void 154.

In step 206, an inflatable bladder (i.e., bladder 170) is disposed within the closed cross-section 162 of the braided preform 160. This may comprise sliding the bladder 170 into place within a volume enclosed by the closed cross-section 162, while the bladder 170 remains uninflated.

In step 208, controller 112 operates the pressure supply 116 to iteratively apply pressure to the braided preform 160 via the bladder 170, which consolidates the braided preform 160 into a shape for hardening into a composite part. Iterative application of pressure, as used herein, comprises iteratively increasing and decreasing an amount of applied pressure. In one embodiment, iterative application of pressure is performed in cycles, wherein each cycle comprises applying a slowly increasing amount of pressure, and then returning to a baseline pressure. In one embodiment, the cycles are applied in ramps of five-to-ten Pound per Square Inch (PSI) increments, and the increments increase over time (e.g., five to fifteen PSI, fifteen to twenty PSI, twenty to twenty-five PSI, etc.) until a desired peak pressure (e.g., one hundred PSI, thirty PSI, etc.) is reached. In further embodiments, the bladder includes multiple independently controllable cells that are capable of applying differing amounts of pressure than each other.

By iteratively applying pressure in this manner, fiber intersections that have locked under pressure are allowed to relax. This enables fibers within each intersection to slightly adjust their angle, which prevents the intersections from locking the next time pressure is applied. This technique may also be performed across multiple cycles run concurrently across multiple cells or bladders. Furthermore, controller 112 may operate heater 118 during all or a portion of step 208, in order to further facilitate consolidation of fibers and thermoplastic within the braided preform 160. Upon completion of consolidation, the preform is hardened into a composite part for use in any suitable structure, such as a fuel line for use within a portion of an aircraft. Thus, the techniques described above use the bladder to stretch the preform in order to remove out of tolerance conditions and enforce a desired shape and/or thickness onto the preform.

The method may further comprise removing the bladder 170 from the braided preform 160, and removing the braided preform 160 from the mandrel 150.

Method 200 provides a substantial technical benefit over prior techniques for consolidating braided fiber reinforced thermoplastic composite preforms, because it enables intersections between fibers to relax during the application of pressure. This in turn enables fibers to move with respect to each other, which helps to prevent shear locking or other undesirable friction locking encounters from being encountered as pressure is increased.

Figure 3:
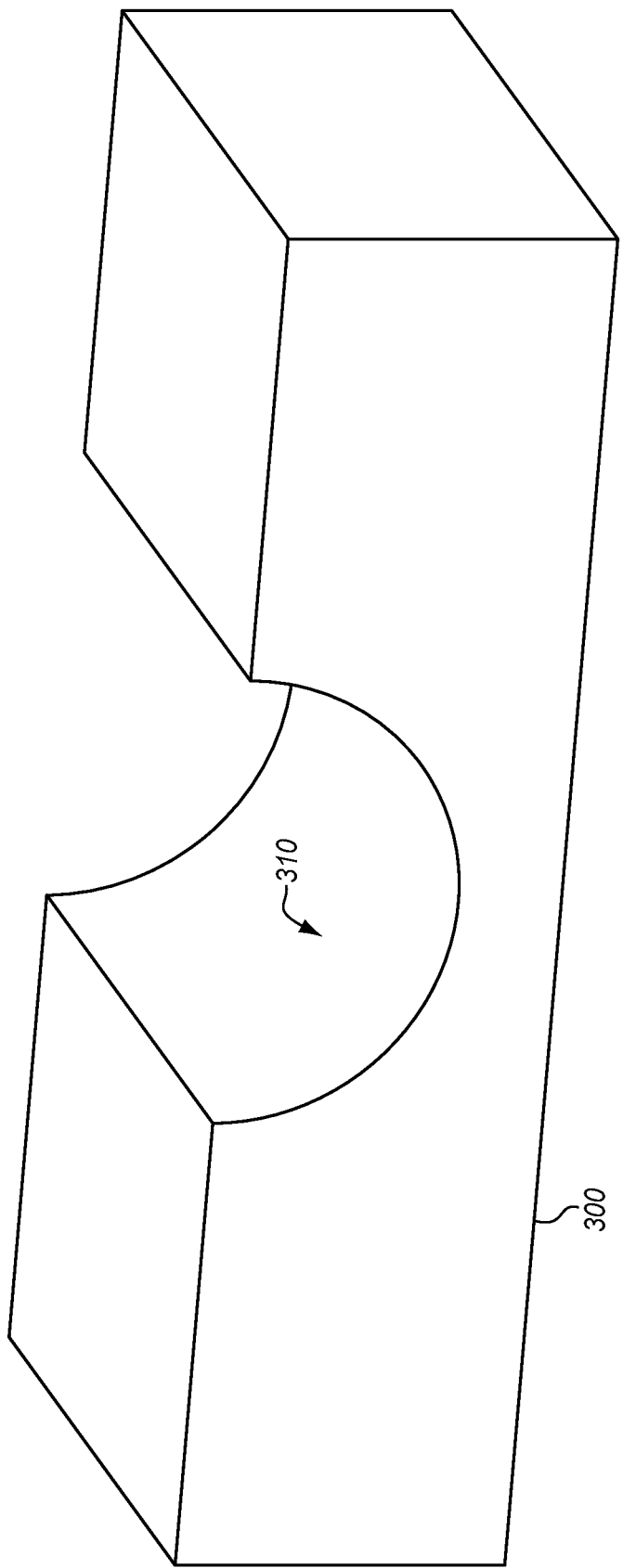
FIGS. 3-7 are perspective views of consolidation of a braided preform via a consolidation system in an illustrative embodiment.
Figure 4:
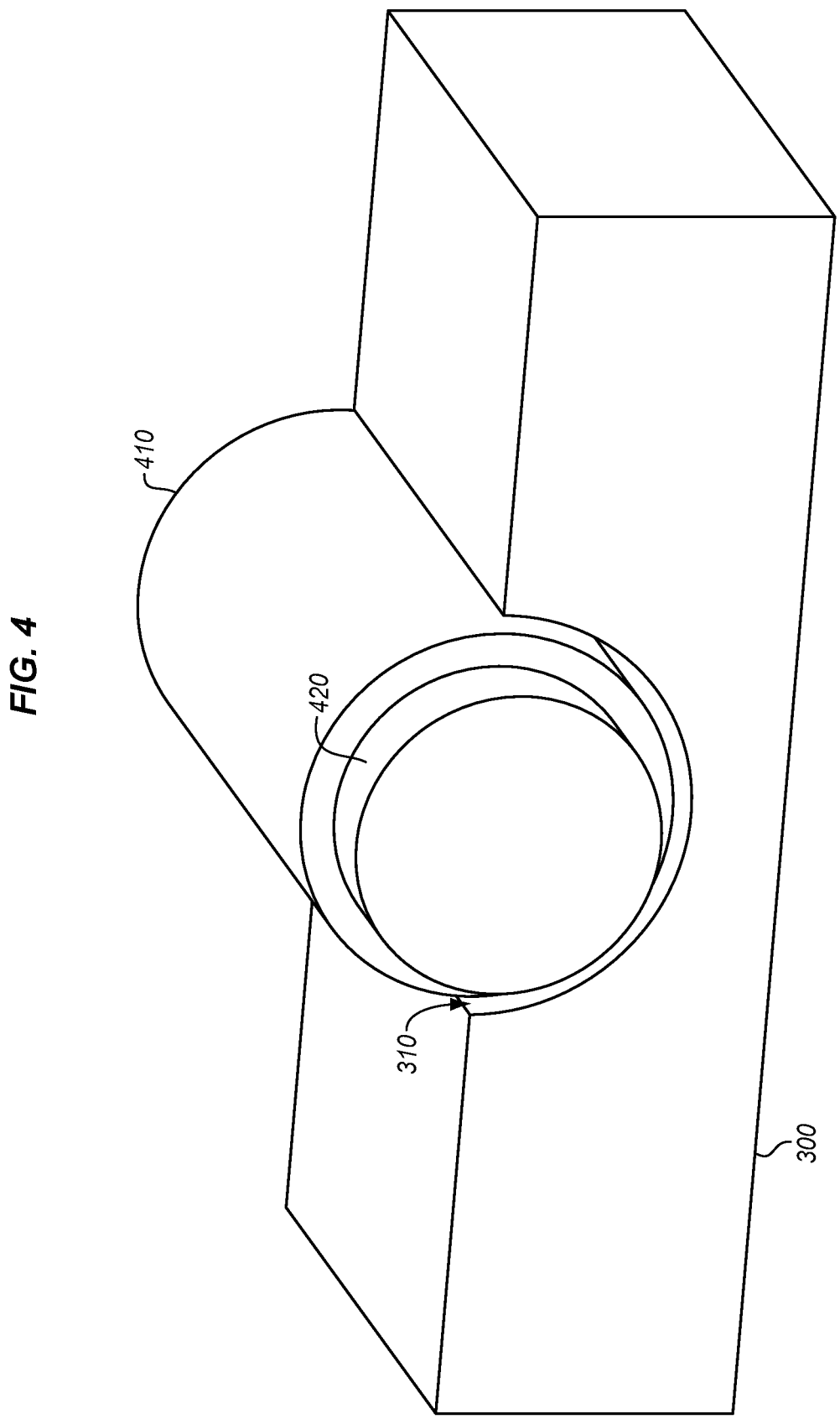
Figure 5:
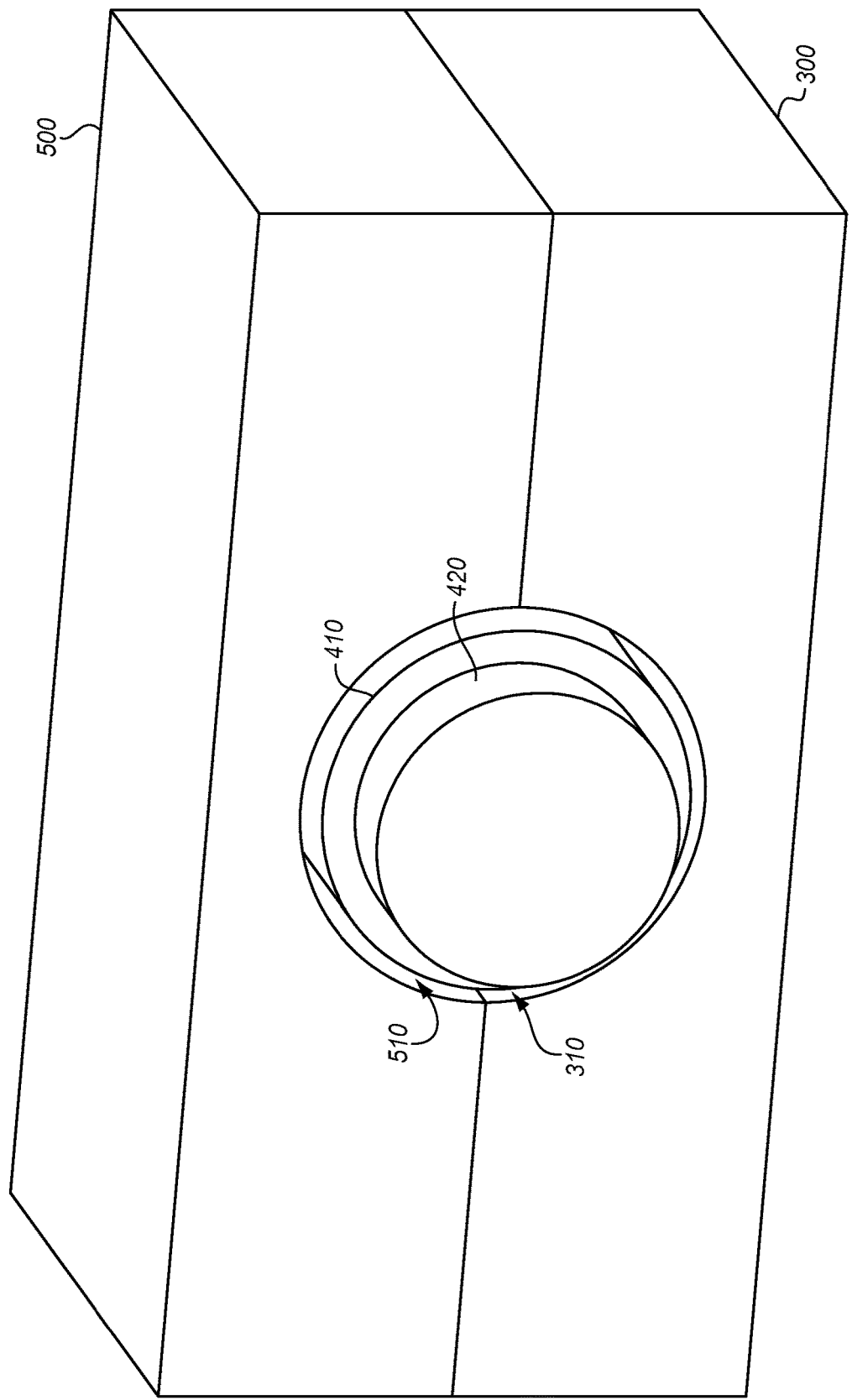

FIGS. 3-7 are perspective views of consolidation of a braided preform via a consolidation system in an illustrative embodiment. Specifically, FIG. 3 illustrates a portion 300 of a consolidation mandrel, which includes a cut-out 310 for receiving a braided preform. FIG. 4 illustrates insertion of a braided preform 410, which is laid-up onto a layup mandrel 420, into the cut-out 310. At this point in time, the braided preform 410 has not been consolidated, and hence in some embodiments does not perfectly fill or otherwise contact the boundary of cut-out 310. In FIG. 5, another portion (i.e., portion 500) of the consolidation mandrel is placed atop the portion 300, in alignment with portion 300. The portion 500 includes a cut-out 510, which is complementary with a cut-out 310 to form a void.

Figure 6:
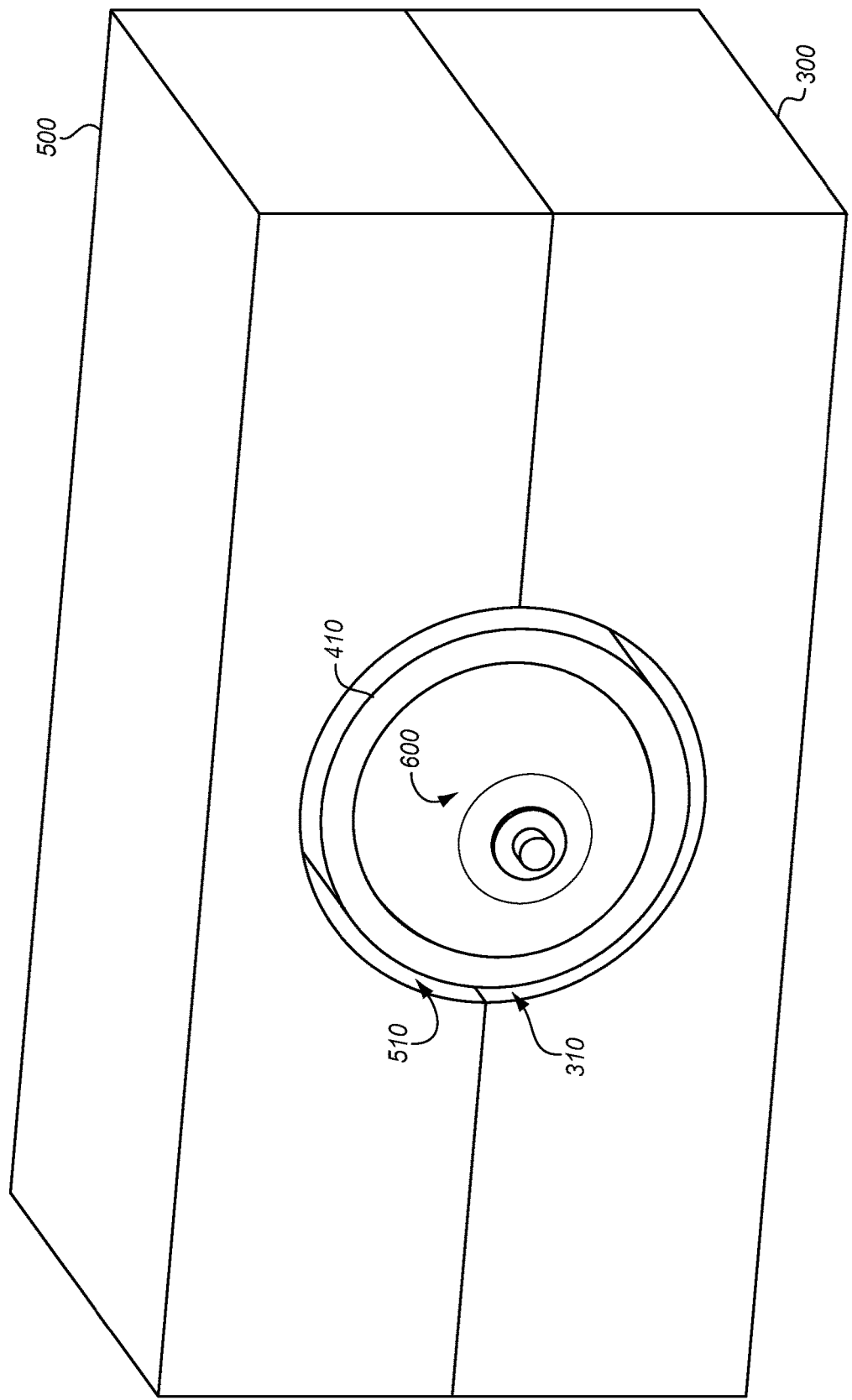
Figure 7:
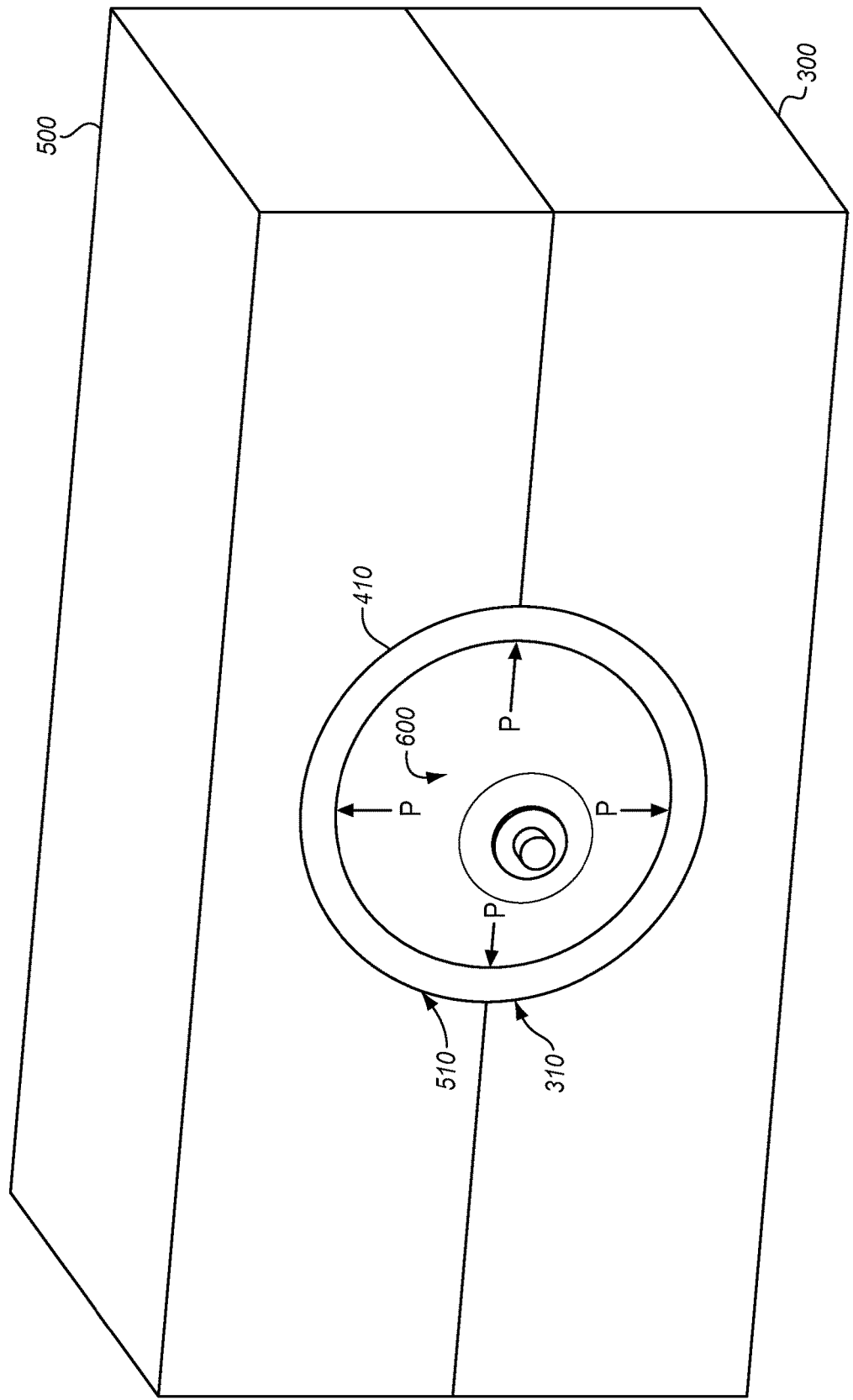

In FIG. 6, the layup mandrel 420 is removed from the braided preform 410, and a bladder 600 (e.g., an inflatable bladder) is inserted into the braided preform 410. In FIG. 7, the bladder 600 is iteratively pressurized to consolidate the braided preform 410 against the cut-out 310 and the cut-out 510.

FIGS. 8-11 are charts illustrating pulsed pressurization techniques for performing consolidation in illustrative embodiments. Specifically, FIGS. 8-11 illustrate exemplary pressurization techniques which may be utilized to perform pulsed pressurization.

Figure 8:
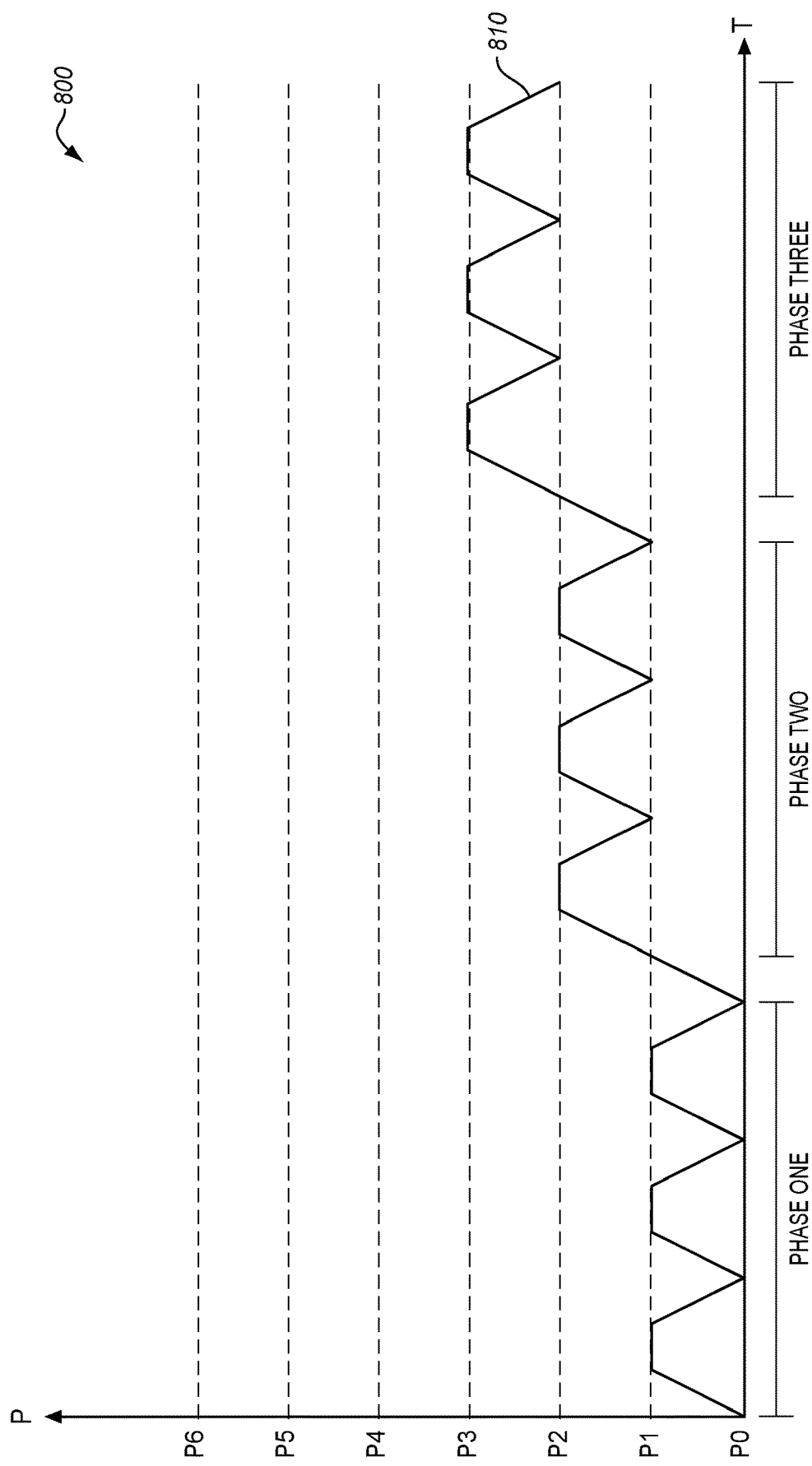
FIGS. 8-11 are charts illustrating pulsed pressurization techniques for performing consolidation in illustrative embodiments.

FIG. 8 is a chart 800 illustrating a pulsed pressurization technique 810, in which pressure P is applied by a bladder to a braided preform over time T. The pressure is iteratively ramped from a lower bound P0 to an upper bound P1 defining a first range of pressures, held at P1, and then reduced to P0 for N cycles (in this case, N is three) during a first phase. The pressure is them ramped from a lower bound P1 to an upper bound P2 defining a second range of pressures, held at P2, and returned to P1 for N cycles during a second phase. This pattern continues, as a controller iteratively applies pressure by ramping pressure from a lower bound to an upper bound for each of multiple ranges of pressures, until a desired peak pressure is reached. In further embodiments, N varies depending on the pressures involved. In still further embodiments, heat is applied to the braided preform during one or more of the phases discussed above, to increase a temperature of the braided preform to just below (e.g., within thirty degrees Fahrenheit of) a melting temperature of thermoplastic in the braided preform. In yet further embodiments, the ramp rate is varied by a controller between cycles or phases, such that certain cycles or phases (e.g., those occurring earlier in time) having a lower ramp rate at which pressure is increased.

Figure 9:
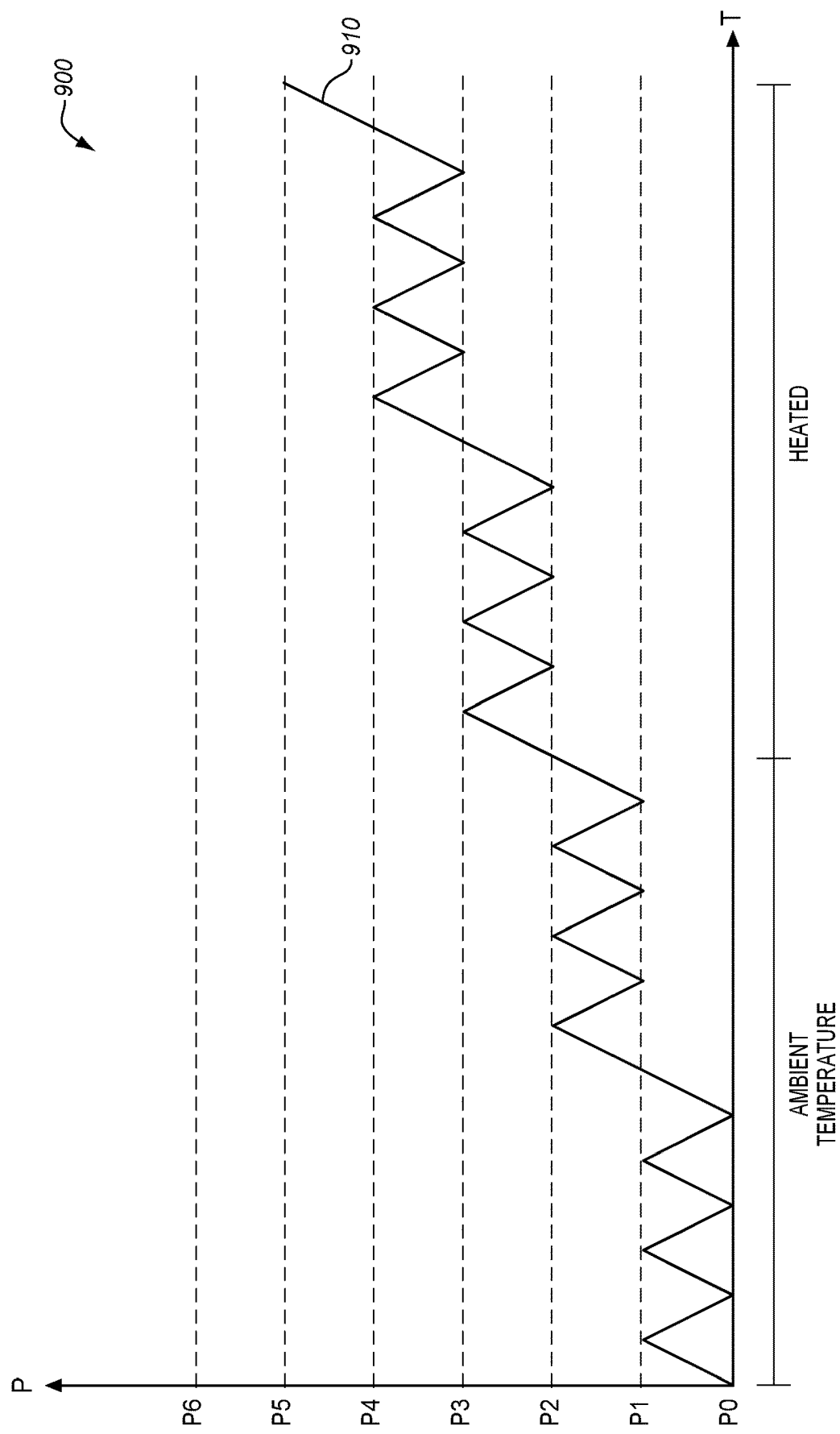

FIG. 9 is a chart 900 illustrating a pulsed pressurization technique 910, in which pressure P is applied by a bladder to a braided preform over time T. The pressure is iteratively ramped from a pressure P0 to a pressure P1, and returned to P0 for N cycles, then the pressure is iteratively ramped from P1 to P2 and returned to P1. Initial cycles are performed at ambient temperature (e.g., room temperature), while further cycles are performed while heat is applied.

Figure 10:
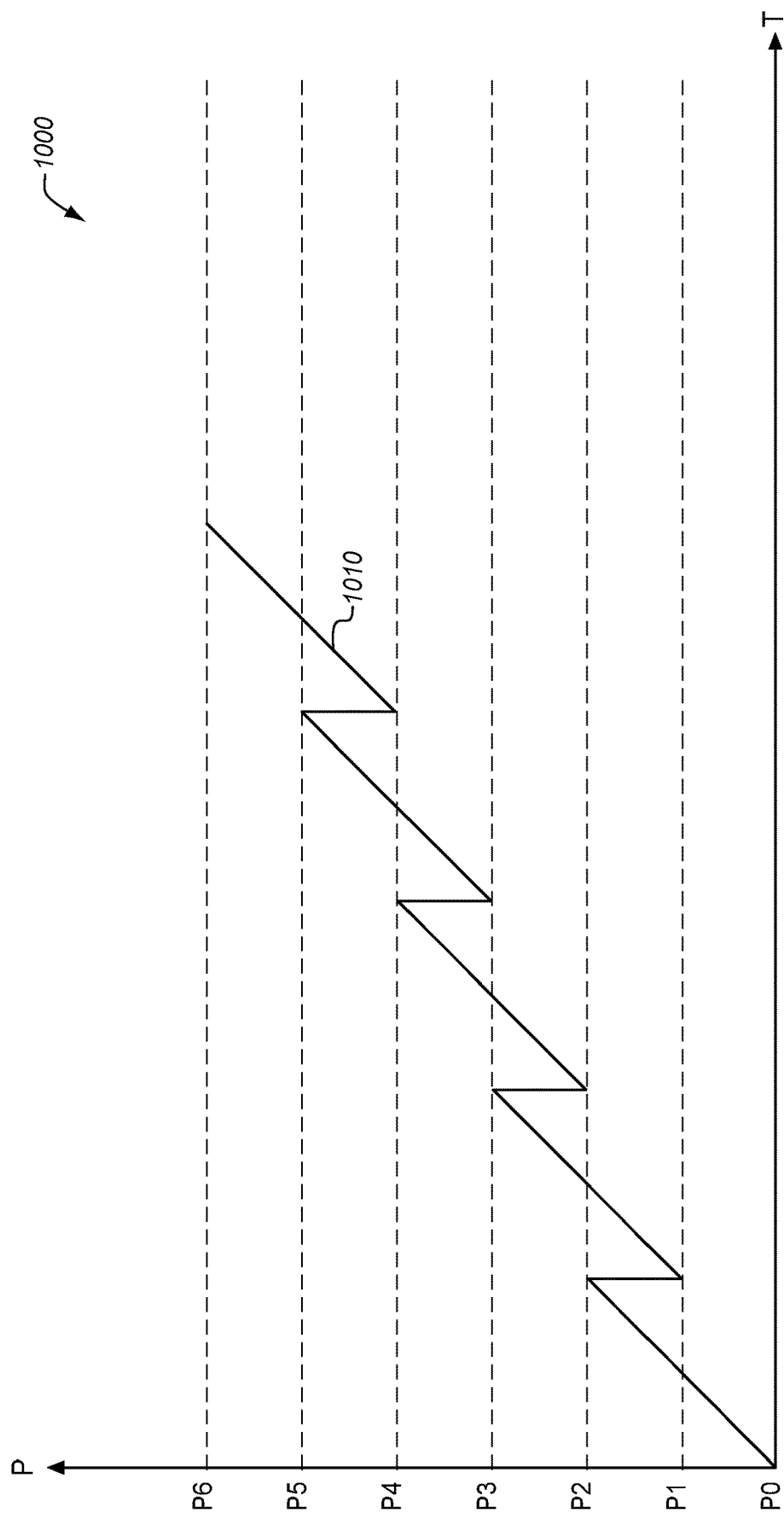
Figure 11:
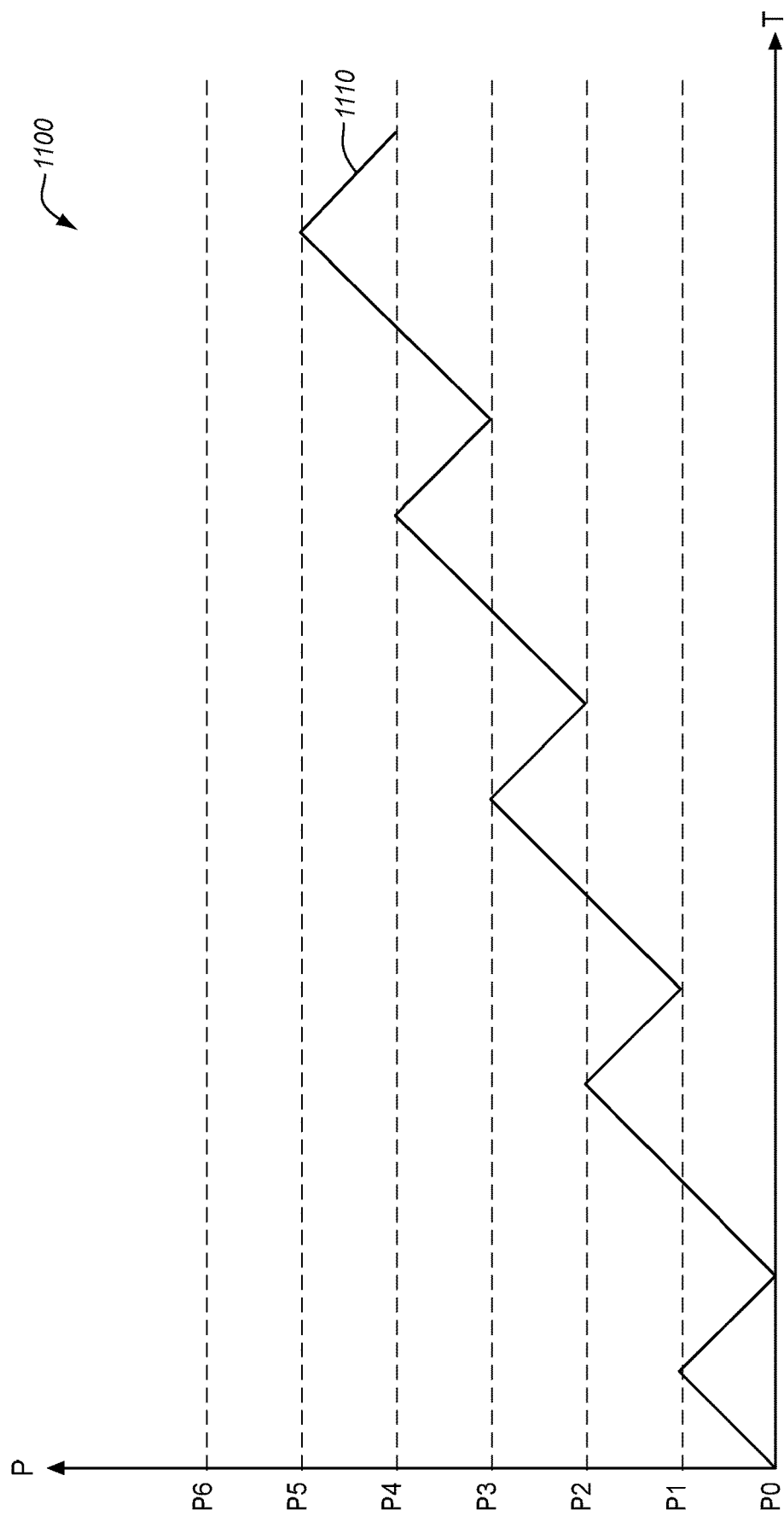

FIG. 10 is a chart 1000 illustrating a pulsed pressurization technique 1010, in which pressure P is applied by a bladder to a braided preform over time T. The pressure is iteratively applied in a ramp from a pressure P0 to a pressure P2, and immediately dropped to P1. Then, pressure is ramped to P3 and dropped to P2, etc. in a staggered pattern FIG. 11 is a chart 1100 illustrating a pulsed pressurization technique 1110, in which pressure P is applied by a bladder to a braided preform over time T. The pressure is ramped from a pressure P0 to a pressure P1, returned to P0, increased to P2, reduced to P1, increased to P3, reduced to P2, increased to P4, reduced to P3, etc. in a staggered pattern. In further embodiments, any suitable combination of the techniques discussed above may be utilized in order to perform pulsed pressurization.

Any of the various techniques described above may be utilized to help reduce the potential for shear locking or other frictional locking issues from being encountered during consolidation of a braided thermoplastic part. Hence, usage of the techniques described above decreases the likelihood of fabricated composite parts being fabricated out-of-tolerance, which increases efficiency, reduces cost, and reduces labor.

Figure 12:
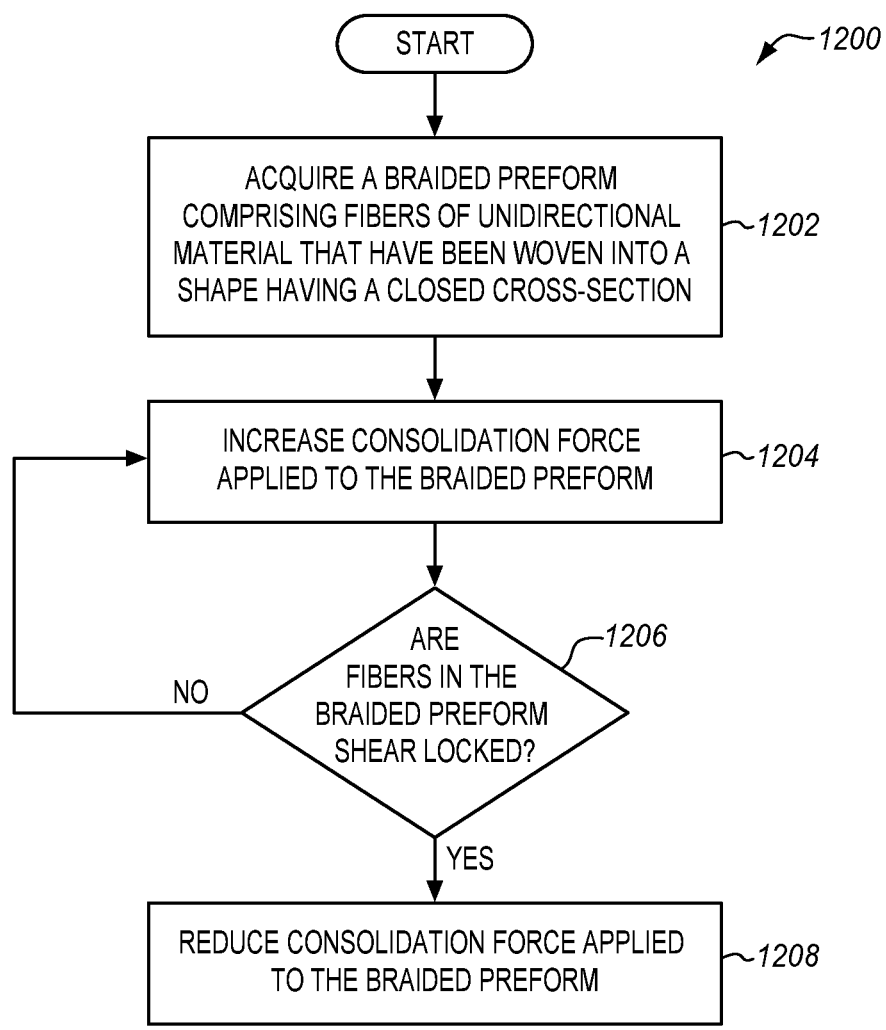
FIG. 12 is a flowchart illustrating a further method for operating a consolidation system in an illustrative embodiment.

FIG. 12 is a flowchart illustrating a further method 1200 for operating a consolidation system in an illustrative embodiment. According to method 1200, step 1202 includes acquiring a braided preform comprising fibers of unidirectional material that have been woven into a shape having a closed cross-section. A mandrel may be placed around the braided preform, and a bladder inserted into a volume defined by the closed cross-section. The bladder may also be inflated until it contacts the preform and applies consolidation force.

Step 1204 includes increasing a consolidation force applied to the braided preform, and step 1206 includes determining whether fibers in the braided preform are shear locked. This may be determined based on an amount of counter-force applied over time by the braided preform to the bladder as pressure is increased, or by other means. For example, if the braided preform immediately resists the application of pressure, instead of deforming, then shear-lock between fibers in the preform is determined to exist. For example, this may be determined based on manual inspection, or automatically based on pressure values increasing more rapidly than expected over time. That is, if no shear lock exists, a specific mass of gas applied to a bladder expands the preform, which increases a volume of the bladder. Because the volume of the bladder increases, pressure does not increase as much as it would if the bladder retained its shape. That is, according to the ideal gas law, the increase in volume occupied by the gas at least partially compensates for the additional mass of gas. In contrast, if a shear lock exists, then applying a mass of gas to the bladder immediately increases pressure, because the shear lock at the preform prevents the bladder from increasing in volume or otherwise changing shape at one or more locations. Thus, pressure rises at a higher rate than it would if no shear lock existed, which is detectable as a difference in pressure ramp rate.

In response to determining that the fibers in the braided preform are not shear locked, the consolidation force is further increased in step 1204. Alternatively, in response to determining that the fibers in the braided preform are shear locked, step 1208 includes decreasing/reducing the consolidation force applied by the bladder (e.g., by reducing pressure applied to the bladder. The steps of method 1200 may be performed iteratively over time in order to ease a braided preform into a desired shape.

EXAMPLES

In the following examples, additional processes, systems, and methods are described in the context of a consolidation system for thermoplastic preforms.

Figure 13:
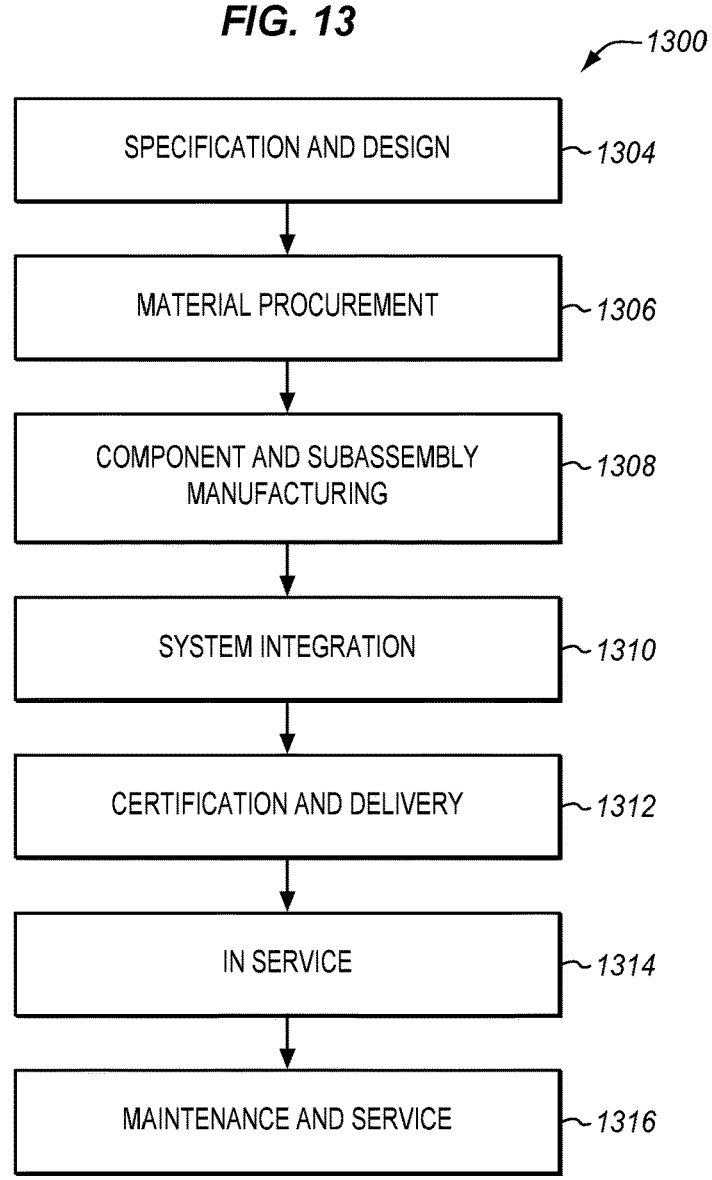
FIG. 13 is a flow diagram of aircraft production and service methodology in an illustrative embodiment.
Figure 14:
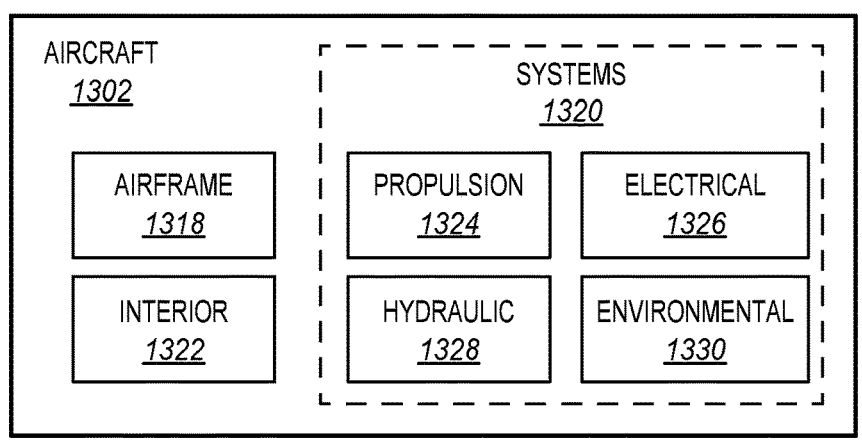
FIG. 14 is a block diagram of an aircraft in an illustrative embodiment.

Referring more particularly to the drawings, embodiments of the disclosure may be described in the context of aircraft manufacturing and service in method 1300 as shown in FIG. 13 and an aircraft 1302 as shown in FIG. 14. During pre-production, method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine work in maintenance and service 1316 (which may also include modification, reconfiguration, refurbishment, and so on). Apparatus and methods embodied herein may be employed during any one or more suitable stages of the production and service described in method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion system 1324, electrical system 1326, hydraulic system 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by method 1300 may include an airframe 1318 with a plurality of systems 1320 and an interior 1322. Examples of systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1300. For example, components or subassemblies corresponding to component and subassembly manufacturing 1308 may be fabricated or manufactured in a manner similar to components or subassemblies produced while the aircraft 1302 is in service. Also, one or more apparatus embodiments, method embodiments, or a combination thereof may be utilized during the subassembly manufacturing 1308 and system integration 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation during the maintenance and service 1316. For example, the techniques and systems described herein may be used for material procurement 1306, component and subassembly manufacturing 1308, system integration 1310, service 1314, and/or maintenance and service 1316, and/or may be used for airframe 1318 and/or interior 1322. These techniques and systems may even be utilized for systems 1320, including, for example, propulsion system 1324, electrical system 1326, hydraulic 1328, and/or environmental system 1330.

In one embodiment, a part comprises a portion of airframe 1318, and is manufactured during component and subassembly manufacturing 1308. The part may then be assembled into an aircraft in system integration 1310, and then be utilized in service 1314 until wear renders the part unusable. Then, in maintenance and service 1316, the part may be discarded and replaced with a newly manufactured part. Inventive components and methods may be utilized throughout component and subassembly manufacturing 1308 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for consolidating a preform of braided fiber, the method comprising:
   acquiring a braided preform comprising fibers of unidirectional material that have been woven into a shape having a closed cross-section;
   disposing the braided preform within a consolidation mandrel;
   disposing an inflatable bladder within the closed cross-section of the braided preform;
   prior to hardening of the braided preform, iteratively applying pressure to the braided preform via the bladder to consolidate the braided preform against the consolidation mandrel;
   during the iteratively applying pressure, heating the braided preform; and removing the braided preform from the consolidation mandrel for hardening into a composite part.

2. The method of claim 1 wherein:
applying pressure comprises ramping pressure from a lower bound to an upper bound of a range of pressures.

3. The method of claim 1 wherein:
iteratively applying pressure comprises ramping pressure from a lower bound to an upper bound for each of multiple ranges of pressures.

4. The method of claim 3 wherein:
iteratively applying pressure comprises ramping pressure from a lower bound to an upper bound for a first range of pressures, and ramping pressure from a lower bound to an upper bound for a second range of pressures, wherein each pressure in the second range of pressures is equal to or greater than each pressure in the first range of pressures.

5. The method of claim 1 wherein:
the braided preform is pre-impregnated with a thermoplastic, and the method further comprises:
heating the braided preform to a processing temperature below a melting temperature of the thermoplastic while iteratively applying the pressure.

6. The method of claim 1 further comprising:
removing the bladder from the braided preform; and
removing the preform from the consolidation mandrel.

7. The method of claim 1 wherein:
the braided preform is dry.

8. The method of claim 1 further comprising:
holding multiple portions of the consolidation mandrel in contact to define a boundary of the braided preform.

9. The method of claim 1 further comprising:
automatically determining whether the fibers in the braided preform have shear-locked while the pressure is iteratively applied.

10. A portion of an aircraft assembled according to the method of claim 1.

11. A non-transitory computer readable medium embodying programmed instructions which, when executed by a processor, are operable for performing a method for consolidating a preform of braided fiber, the method comprising:
acquiring a braided preform comprising fibers of unidirectional material that have been woven into a shape having a closed cross-section;
disposing the braided preform within a consolidation mandrel;
disposing an inflatable bladder within the closed cross-section of the braided preform;
prior to hardening of the braided preform, iteratively applying pressure to the braided preform via the bladder to consolidate the braided preform against the consolidation mandrel;
during the iteratively applying pressure, heating the braided preform; and
removing the braided preform from the consolidation mandrel for hardening into a composite part.

12. The medium of claim 11 wherein:
applying pressure comprises ramping pressure from a lower bound to an upper bound of a range of pressures.

13. The medium of claim 11 wherein:
iteratively applying pressure comprises ramping pressure from a lower bound to an upper bound for each of multiple ranges of pressures.

14. The medium of claim 13 wherein:
iteratively applying pressure comprises ramping pressure from a lower bound to an upper bound for a first range of pressures, and ramping pressure from a lower bound to an upper bound for a second range of pressures, wherein each pressure in the second range of pressures is equal to or greater than each pressure in the first range of pressures.

15. The medium of claim 11 wherein:
the braided preform is pre-impregnated with a thermoplastic, and the method further comprises:
heating the braided preform to a processing temperature below a melting temperature of the thermoplastic while iteratively applying the pressure.

16. The medium of claim 11 wherein the method further comprises:
removing the bladder from the braided preform; and
removing the preform from the consolidation mandrel.

17. The medium of claim 11 wherein:
the braided preform is dry.

18. The medium of claim 11 wherein the method further comprises:
holding multiple portions of the consolidation mandrel in contact to define a boundary of the braided preform.

19. The medium of claim 11 wherein the method further comprises:
automatically determining whether the fibers in the braided preform have shear-locked while the pressure is iteratively applied.

20. A portion of an aircraft assembled according to the method defined by the instructions stored on the computer readable medium of claim 11.

21. An apparatus for consolidating a preform of braided fiber, the apparatus comprising:
a consolidation mandrel that is dimensioned to receive a braided preform;
a bladder that is dimensioned to fit within a closed cross-section of the braided preform;
a controller that iteratively applies pressure to the braided preform via the bladder to consolidate the braided preform against the consolidation mandrel, prior to hardening of the braided preform into a composite part; and
a heater that heats the braided preform while the controller iteratively applies the pressure to the braided preform.

22. The apparatus of claim 21 wherein:
the controller applies pressure by ramping pressure from a lower bound to an upper bound of a range of pressures.

23. Fabricating a portion of an aircraft using the apparatus of claim 21.

24. A method for consolidating a braided preform, the method comprising:
acquiring a braided preform comprising fibers of unidirectional material that have been woven into a shape having a closed cross-section;
increasing a consolidation force applied to the braided preform; and
determining whether the fibers in the braided preform are shear locked, wherein:
in response to determining that the fibers in the braided preform are not shear locked, further increasing the consolidation force; and
in response to determining that the fibers in the braided preform are shear locked, decreasing the consolidation force.

25. A portion of an aircraft assembled according to the method of claim 24.

* * * * *